United States Patent Office 2,816,391
Patented Dec. 17, 1957

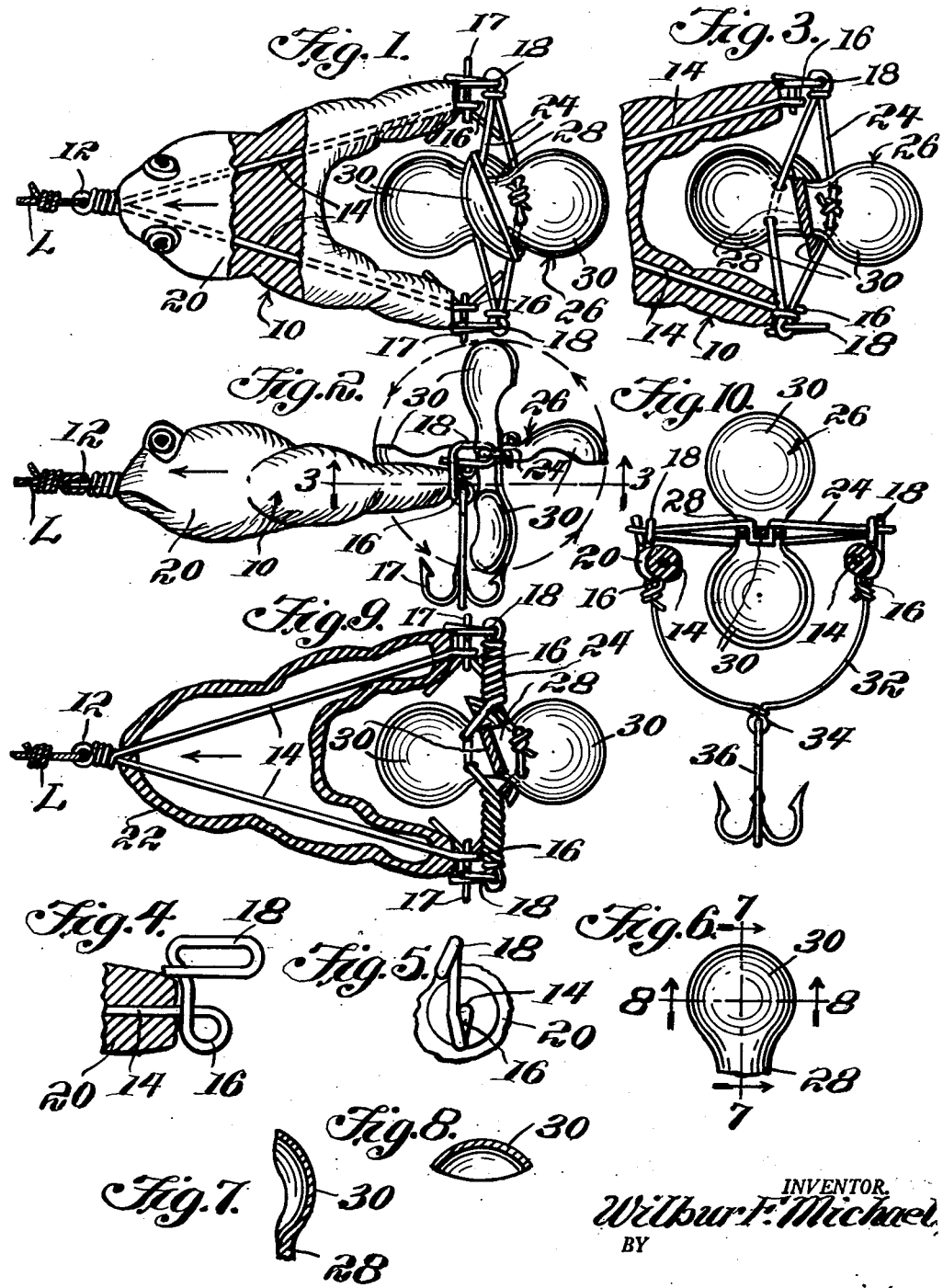

2,816,391

FISH LURE

Wilbur F. Michael, New Orleans, La.

Application July 22, 1955, Serial No. 523,720

6 Claims. (Cl. 43—26.2)

This invention relates to an improved fish lure.

A primary object of the invention is to provide an improved fish lure which in action simulates a live bait fish swimming along the surface of the water and produces a popping and gurgling sound as it moves in an erratic wiggling course.

A further object of the invention is to provide a lure having the ability to reverse its direction of movement to enable the lure to retreat under overhanging branches, limbs of trees, etc.

In the drawings:

Figure 1 is a top plan view of a fish lure embodying the features of this invention;

Figure 2 is a side view of the lure illustrated in Figure 1;

Figure 3 is a fragmentary sectional view taken substantially on the line 3—3 of Figure 2;

Figure 4 is a fragmentary enlarged vertical longitudinal sectional view taken through the rear end of one of the legs;

Figure 5 is a right hand end view of the portion of the device shown in Figure 4;

Figure 6 is a fragmentary view of one of the paddles;

Figure 7 is a sectional view taken substantially on the line 7—7 of Figure 6;

Figure 8 is a sectional view taken substantially on the line 8—8 of Figure 6;

Figure 9 is a horizontal sectional view through a modified form of lure; and

Figure 10 is an end view of a further modified form of lure, partly in section.

Referring to the drawings in detail, the illustrated fish lure designated generally 10 comprises an eye 12 carrying rearwardly divergent legs 14 which terminate at their rear ends in closed loops 16 to which fish hooks 17 are connected. The loops 16 eventuate in elongated loops 18 positioned above the closed loops 16 for a purpose to be more fully hereinafter described. In one form of the invention, the legs 14 are enclosed in a solid body 20 of buoyant material, although it will be understood that the legs may be enclosed in a hollow buoyant body 22, as shown in Figure 9.

Stretched between the loops 18 are extensible elastic members 24, such as rubber bands, upon which is mounted a paddle wheel designated generally 26. The paddle wheel 26 comprises a hub portion 28 carrying an annular series of outwardly extending paddles 30, each of which is of concavo-convex form and the buoyancy of the bodies 20 or 22 is such that only the paddles which lie below a predetermined water level will be submerged in a body of water in which the lure is being used. It will thus be seen that as the lure is drawn through the water by a conventional fish line secured to the eye 12, the paddle wheel 26 will be rotated to cause the elastic member 24 to be wound, as illustrated in Figure 9. Obviously, as tension on the fishing line connected to the eye 12 is relaxed, the elastic member 24 wound, as illustrated in Figure 9, will cause the paddle wheel 26 to rotate in a reverse direction and thereby cause the lure to move rearwardly or in a direction reverse from that in which it moves under the influence of the fishing line. It is to be noted that the leading edges of the concave sides of alternate paddles 30 are disposed at an angle to the axis of rotation of the paddle wheel 26 so that whether the lure is being moved under the influence of the paddle wheel or under the influence of the fishing line to which it is attached, a wiggling motion will be imparted to the lure by the fact that one portion of each alternate blade 30 enters the water in advance of the other portion of the same blade which action tends to throw the lure from side to side. Moreover, the angular relationship of the blades is such that as they enter the water a gurgling or popping sound is produced to further enhance the value of the lure.

In the modified form of the invention, illustrated in Figure 10, which is otherwise similar to that shown in Figure 1, the eyes 16 have connected thereto opposite ends of a U-shaped bar 32 which may or may not replace the hooks 17, which U-shaped bar 32 carries intermediate its ends an eye 34 on which a hook 36 is suspended.

In use, the eye 12 is coupled to a conventional fishing line L and the lure is deposited on the surface of the water and floats thereon. As pull is exerted on the line L of the fishing lure, the lure moves forwardly along the surface of the water and the paddle wheel rotates and winds the elastic band 24, as shown in Figure 9. The wound band 24 produces reverse rotation of the paddle wheel when tension on the line L is relaxed and this moves the lure rearwardly. Owing to the angular relation of the leading edges of alternate paddles, the lure will progress along the water with a sidewise wiggling motion whether moving forwardly or rearwardly. The contact of the concave and convex sides of the paddles with the water while the paddle wheel is turning produces a popping and gurgling sound such as might be produced by a fish within the water. By adjusting the extensible member 24 on the elongated loops 18 so that it extends diagonally across the lure, the lure may be made to travel in an arcuate path by the paddle wheel 26.

In use of the modified form of the invention of Figure 10, the U-shaped bar 32 assumes a substantially horizontal trailing position when the lure is pulled forwardly by the fishing line L so as to avoid entangling the hook 36 with weeds or the like. When the lure is moved in reverse or remains stationary, the member 32 and hook 36 depend from the lure. Obviously, when the member 32 and the hook 36 lie substantially horizontally, the paddle wheel will serve as a guard to prevent contact of weeds with the member 32 and the hook 36.

In view of the above, it will be evident that the wiggling of the lure will attract other fish which will be induced to strike the lure since it gives the illusion of being alive.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In a fish lure, a pair of rearwardly divergent legs having forward ends and rear ends, a line attaching eye securing the forward ends of the legs together, fixed eyes on the rear ends of the legs, depending hook means secured to said fixed eyes, loops on the rear ends of the legs, an elastic band secured to and stretched between said loops, and a paddle wheel having a hub mounted on said band and arranged to tension wind said band as the lure is drawn forwardly in water.

2. In a fish lure, a pair of rearwardly divergent legs having forward ends and rear ends, a line attaching eye securing the forward ends of the legs together, fixed eyes on the rear ends of the legs, depending hook means secured to said fixed eyes, loops on the rear ends of the legs, an elastic band secured to and stretched between said loops, and a paddle wheel having a hub portion mounted on said band and arranged to tension wind said band as the lure is drawn forwardly in water, a buoyant body having leg portions enclosing said legs to float the lure on the surface of water, said body having another portion extending between said leg portions and spaced forwardly from the rear ends of the legs.

3. A fish lure according to claim 1 wherein said depending hook means comprises hooks secured to said fixed eyes.

4. A fish lure according to claim 1 wherein said hook means comprises a U-shaped bar having ends pivotally connected to the fixed eyes, said U-shaped bar depending from the fixed eyes between the legs, and a hook secured to and depending from said U-shaped bar.

5. In a fish lure, a pair of rearwardly divergent legs having forward ends and rear ends, a line attaching eye securing the forward ends of the legs together, fixed eyes on the rear ends of the legs, depending hook means secured to said fixed eyes, loops on the rear ends of the legs, an elastic band secured to and stretched between said loops, and a paddle wheel having a hub portion mounted on said band and arranged to tension wind said band as the lure is drawn forwardly in water, said paddle wheel comprising convex-concave blades arranged about and projecting from the hub.

6. In a fish lure, a pair of rearwardly divergent legs having forward ends and rear ends, a line attaching eye securing the forward ends of the legs together, fixed eyes on the rear ends of the legs, depending hook means secured to said fixed eyes, loops on the rear ends of the legs, an elastic band secured to and stretched between said loops, and a paddle wheel having a hub portion mounted on said band and arranged to tension wind said band as the lure is drawn forwardly in water, said paddle wheel comprising convex-concave blades arranged about and projecting from the hub portion, said blades having leading edges and trailing edges, the leading edges of alternate blades being mutilated to produce sidewise wiggling of the lure as the paddle wheel is rotated.

References Cited in the file of this patent

UNITED STATES PATENTS

| | | |
|---|---|---|
| D. 62,518 | Clark | June 12, 1923 |
| 588,729 | Harris | Aug. 24, 1897 |
| 825,140 | Lull | July 3, 1906 |
| 1,689,541 | Welch | Oct. 30, 1928 |
| 2,230,919 | Wick | Feb. 4, 1941 |
| 2,504,229 | Sinclair | Apr. 18, 1950 |
| 2,516,133 | Martin | July 25, 1950 |
| 2,752,718 | Poniatowski | July 3, 1956 |